United States Patent
Keely et al.

(10) Patent No.: US 7,239,505 B2
(45) Date of Patent: Jul. 3, 2007

(54) DIRECT HINGE FOR OPTIMIZING CONVERSION

(75) Inventors: Leroy B. Keely, Portola Valley, CA (US); John Philip Stoddard, Ben Lomond, CA (US); Jon H. LeFors, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 15 days.

(21) Appl. No.: 10/960,496

(22) Filed: Oct. 8, 2004

(65) Prior Publication Data

US 2006/0077622 A1    Apr. 13, 2006

(51) Int. Cl.
*G06F 1/16* (2006.01)

(52) U.S. Cl. .................... 361/681; 361/683

(58) Field of Classification Search ............ 361/681; 248/917, 919, 920
See application file for complete search history.

(56) References Cited

U.S. PATENT DOCUMENTS

| | | | | |
|---|---|---|---|---|
| 5,085,394 A | * | 2/1992 | Torii | 248/455 |
| 5,200,913 A | * | 4/1993 | Hawkins et al. | 361/681 |
| 5,209,448 A | * | 5/1993 | Hatanaka et al. | 248/455 |
| 5,267,123 A | * | 11/1993 | Boothroyd et al. | 361/681 |
| 5,926,364 A | * | 7/1999 | Karidis | 361/681 |
| 6,223,393 B1 | | 5/2001 | Knopf | |
| 6,233,785 B1 | | 5/2001 | Tanahashi | |
| 6,341,061 B1 | | 1/2002 | Eisbach et al. | |
| 6,778,196 B2 | | 8/2004 | Nakamura | |
| 2003/0052856 A1 | * | 3/2003 | Nakamura | 345/110 |
| 2003/0142474 A1 | | 7/2003 | Karidis et al. | |
| 2004/0114315 A1 | * | 6/2004 | Anlauff | 280/842 |
| 2004/0114319 A1 | | 6/2004 | Hill et al. | |
| 2005/0052834 A1 | * | 3/2005 | Tanaka et al. | 361/681 |

OTHER PUBLICATIONS http://www.acer.com/APP/AKC/INTERNET/AACPubli.nsf/HeadingPagesDisplay/ProductsTablet+PC?OpenDocument&ML1.3&, Welcome to Acer America-Tablet PC-Tablet Home, 2 pages, dated Aug. 9, 2004.
http://www.laxton.net/vadem_clio.htm, Vadem Clio, 1 page, dated Aug. 9, 2004.
http://www.acer.com/APP/AKC/INTERNET/AACPubli.nsf/allDocs/RWPD1F967B0B66C . . . , Welcome to Acer America-Photo Gallery-TravelMate C300, 3 pages dated Aug. 9, 2004.

* cited by examiner

*Primary Examiner*—Lisa Lea-Edmonds
(74) *Attorney, Agent, or Firm*—Banner & Witcoff, Ltd.

(57) ABSTRACT

An electronic device that has a body portion having an internal track, a display portion having a follower member that runs along the internal track and a support arm pivotally coupled to the body portion and to the display portion and enabling the display portion to move between multiple distinct positions relative to the body portion is described. A tablet personal computer can be converted from the tablet mode to the laptop mode in a direct and efficient manner.

16 Claims, 15 Drawing Sheets

DIRECT HINGE FOR OPTIMIZING CONVERSION

FIELD OF THE INVENTION

Aspects of the present invention are directed generally to hybrid or convertible type computing devices, such as personal computing devices, personal digital assistants, and cellular phones. More particularly, aspects of the present invention are directed to a system and apparatus for converting a computing device between a tablet mode and a laptop mode.

BACKGROUND OF THE INVENTION

User interaction with computers continues to increase each day. More jobs require individuals to interact with computers and more people are choosing to interact with computers for both work and entertainment. Initially, personal computing devices were cumbersome devices that included a computer processing unit and monitor. As technology evolved in the area of computing devices, laptop style computers developed allowing users to transport work with them in a smaller and more convenient manner. Yet still, some environments were not conducive to a laptop style computer. During a meeting or conference call, users often find it easier to take notations or highlights of the meeting on a steno pad or paper. Any information had to be inputted into a computing device at a later time.

The development of the computing device then led to the tablet style computing device. Early personal digital assistants (PDAs) allowed users to write onto a surface and an application program on the device would interpret the handwritten strokes as inputs to the device. Users could now write notes during a meeting and have the information directly inputted in a computing device. Users accustomed to a monitor or display and keyboard could not use the tablet style computing devices as easily as a traditional computing device. Further, users had to have two separate computing devices if they wanted to have the ability to make handwritten notes and to type information with an elevated monitor or display. The technology continued to evolve and users were eventually given the option of a hybrid or convertible type computing device.

A convertible type computing device allows a user to convert between a traditional computing device that includes an elevated monitor and keyboard and a tablet style computing device that allows a user to input annotations as if writing on a sheet or paper or pad of paper. FIG. 1 is an example of such a convertible computing device. Convertible computing device 100 includes a monitor 110 and a computer processing hardware 120. Monitor 110 is configured to display images based upon an application program operating on the computer processing hardware 120. As shown in FIG. 1, monitor 110 swivels along a collar connection 130. Collar connection 130 is physically connected to the monitor 110 along an exterior edge of the monitor 110 and is also physically connected to the computer processing base 120 along a corresponding exterior edge of the computer processing hardware 120. The collar connection 130 is configured to rotate in a manner that allows the monitor to be in an upright position, similar to a conventional laptop computing device, or in a level position resting overtop the keyboard of the computing portion 120, similar to a conventional tablet style computing device. All electrical connections between the monitor 110 and the computer processing hardware 120 are housed within the collar connection 130.

Conventional convertible/hybrid computing device 100 requires a complex torque mechanism for operation of the collar connection 130. The internal wires must be specially designed to handle the twisting of the connection point to allow for the swivel between the tablet style and the laptop style formations. In addition, connection point 130 must be able to hold the entire weight of the monitor 110 while in the upright or laptop style formation. Further, collar connection 130 can be damaged if too much force is applied while swiveling the monitor 110 around.

SUMMARY OF THE INVENTION

In an aspect of the invention, the present invention relates to an electronic device that has a body portion having an internal track, a display portion having a follower member that runs along the internal track, and a support arm pivotally coupled to the body portion and to the display portion and enabling the display portion to move between multiple distinct positions relative to the body portion.

A second aspect of the invention provides a hybrid computer that has display and body housings, a flex circuit electronic system, and a non-torque hinge mechanism that houses at least a portion of the flex circuit electronics system and connects the display to the body such that when the computer is in a tablet position the display overlays the body.

A third aspect of the invention provides a coupling system that has a first housing having a display, a second housing including a user input mechanism, a third element for support having a rigid structure, and a coupling system movably linking the first housing element, the second housing element and the third element and having a track and follower mechanism link the first element to the second element so as to permit only translation and rotation of the first element relative to the second element in the x-z plane.

A fourth aspect of the invention provides a computer with a display housing having a front surface with a display and rear surface, an input housing, and a connecting member that links the display housing to the input housing and is completely and continuously disposed within a columnar outline defined by the perimeter of the display extending in directions perpendicular to the front face of the display.

The above and other aspects, features and advantages of the present invention will be readily apparent and fully understood from the following detailed description of the preferred embodiments, taken in connection with the appended drawings.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

Figure 1:
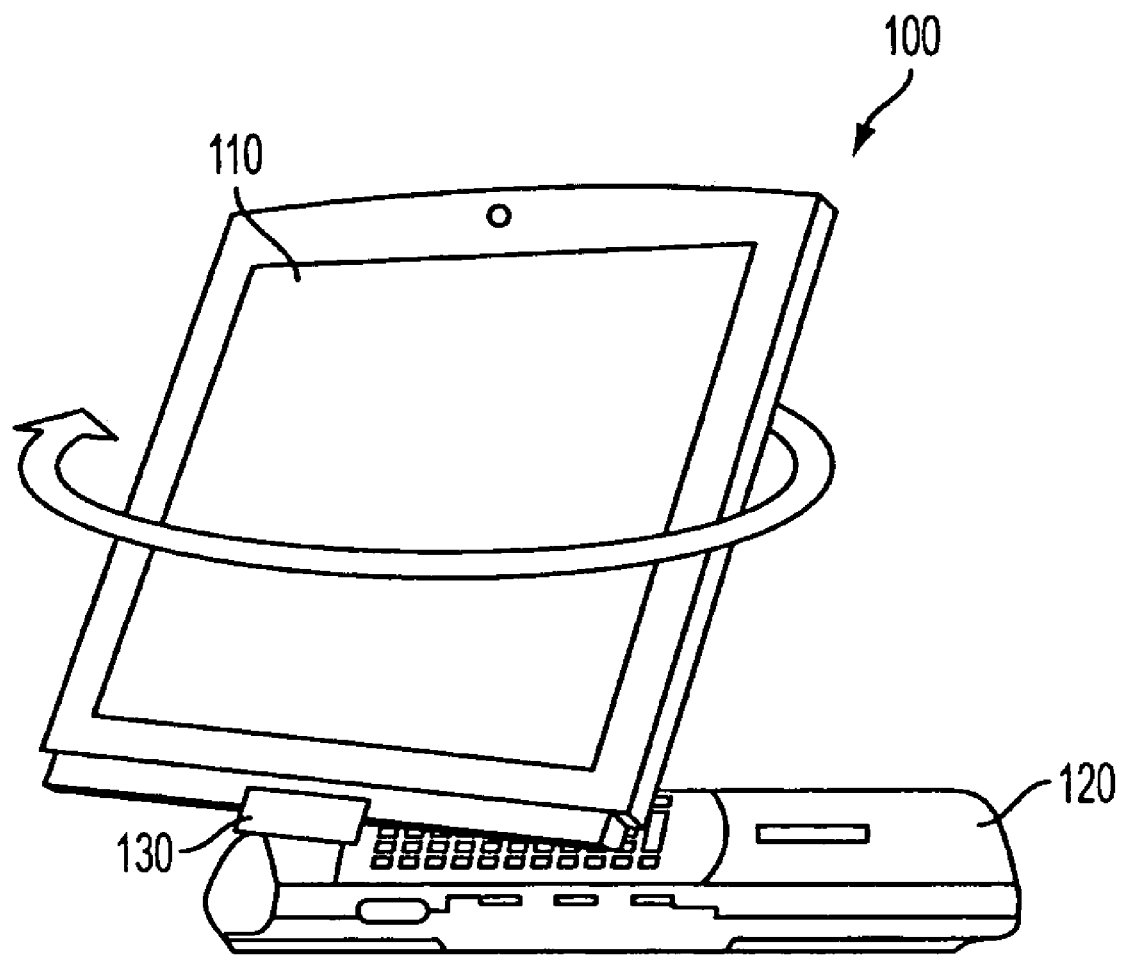
FIG. 1 is a perspective view of an illustrative diagram of a conventional convertible computer.
Figure 2A:
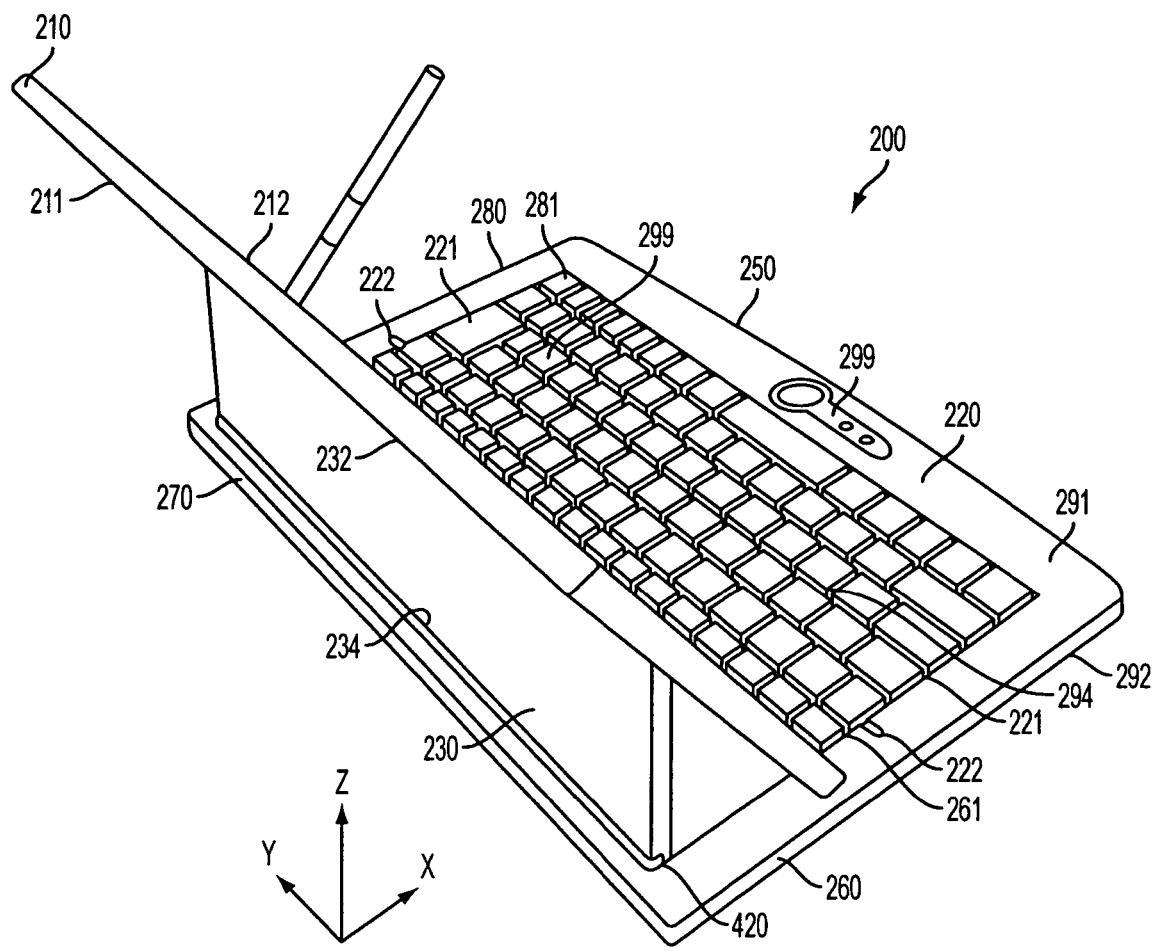
FIG. 2A is a rear perspective view of an illustrative diagram of a computing device according to one or more aspects of the invention.

FIG. 2A illustrates a hinge system for use in a convertible computing device. The hinge system enables a computing device to be move quickly and directly from a first functional position, for example a laptop computer position, to a second functional position, for example a tablet position. The hinge system also provides support in each of the functional positions to allow a user to interact with the computing device and allows for improved functionality of the computing device by facilitating movement between at least two use positions.

The convertible computing device 200 has a display unit 210, a base unit 220 and a support member 230. Display unit 210 may include a wide variety of well known computer or television displays, screens or monitors including LCD screens, touch receptive screens (for example, screens receptive to direct human contact or contact from an instrument such as a pen or stylus), and cathode ray tube screens, etc. The display may be formed of a number of sizes, however, it will preferably be sized so as to utilize a large portion of display unit 210, thereby providing a user with optimized viewing relative to the size of the display unit. These screens may provide video, photographs, text, graphics and any numerous other types of visual information.

Base unit 220 may house the processing and memory components of the electronic device and also contain user input components. Central Processing Unit (CPU) components, memory, power supplies, modem and communication components including wireless cards, and other computing components well know in the art may be housed in the interior of the base unit. The specific components utilized in the computing device will vary depending on the exact functionality desired. A user input region 299 is positioned on an exterior surface of base unit 220. User inputs may include a keyboard, numerical pad, joystick, video game controller button, touch pad, roll pad, mouse ball, LED sensor, etc.

Display unit 210 may be moved relative to base unit 220 as base unit and display unit 210 are linked together by a track and follower coupling at one location and by a support member coupling at another location. Neither coupling is clearly visible in FIG. 2A. (See FIGS. 3A-3D). Linking display unit 210 and base unit 220 at one location by a slidable track 310 and follower 320 and by support member 230 with rotationally hinged ends at another location provides for direct and controlled movement of display unit 210 relative to base unit 220.

One end, e.g. the upper end 232, of support member 230 is rotationally connected by a hinge 410 to display unit 210. Hinge 410 may contact display unit 210 on the display unit's rear face 211. The other end, e.g. the lower end 234, of support member 230 is rotationally connected by another hinge 420 to base unit 220. The entire support member 230 and associated hinges 410 and 420 remain within a region defined by the perimeter of display unit 210 and running perpendicular to the front surface 212 or viewing surface of the display.

Support member 230 may provide structural support to display unit 210 and may limit the range of potential motion of display unit 210 relative to base unit 220. Support member 230 together with the display unit's rear face 211 and the top surface of base unit 220 form a conduit through which electronic circuitry may be run. Support member 230 provides a non-torque hinge, a hinge that does not utilize a single collar reliant upon rotational resistance, to connect display unit 210 to base unit 220. As such, a wide range of circuitry may be utilized without concern for the circuitry being damaged or crimped during use in electronic devices similar to the one depicted in FIG. 2A. In comparison, much fewer types of circuitry are available for use with conventional torque hinge mechanisms due to the stress placed on circuitry housed within the mechanism and the increased risk of damage to the integrity of the circuitry.

FIGS. 2B-2E illustrate alternate embodiments of support members 230 that may be used in convertible computing devices. The respective support members in FIGS. 2B-2E may be configured to have hinges on opposite ends, e.g. 410 and 420. These support members 230 couple base unit 220 and display unit 210 together so as to allow direct and controlled movement. Additionally, support members 230 may house electronic circuitry for use in the electronic device.

Figure 2B:
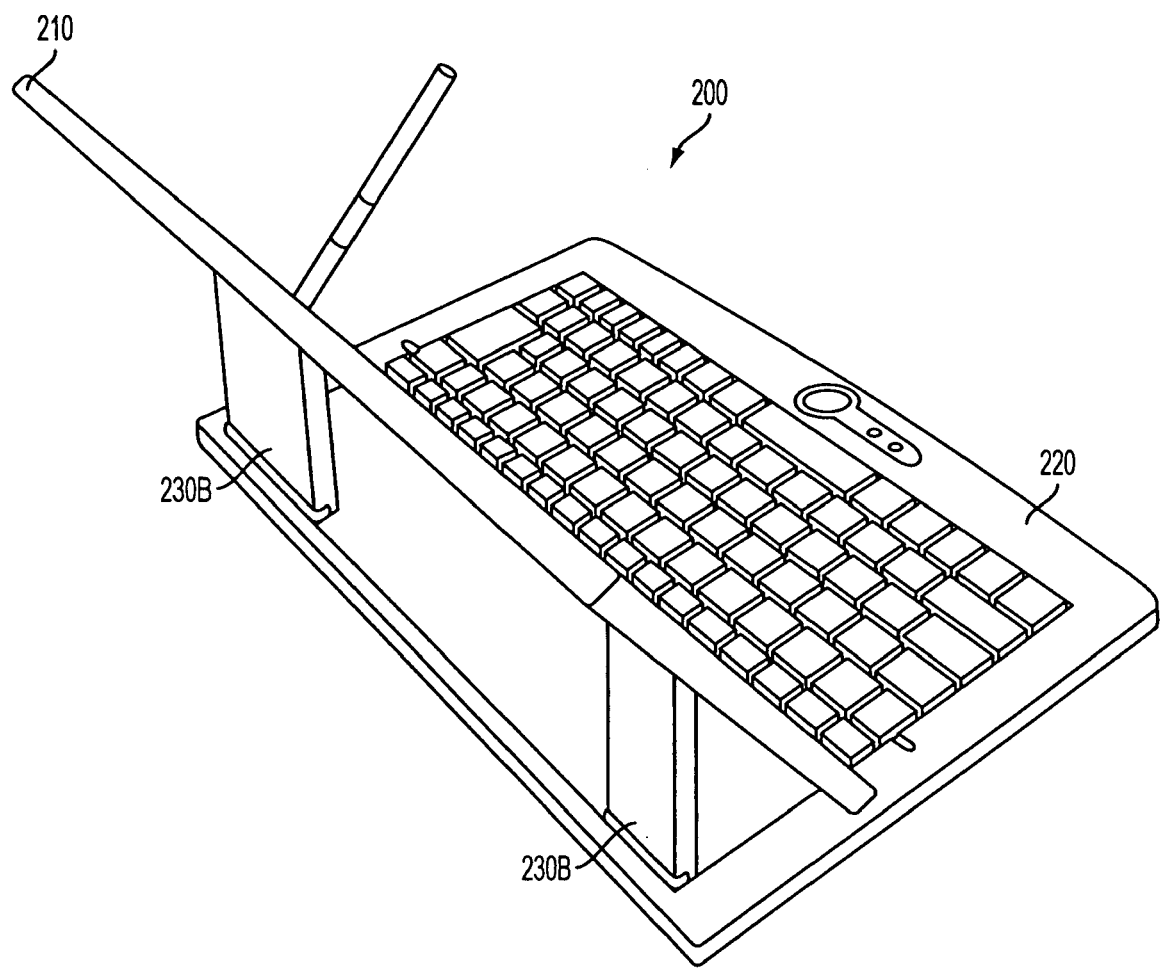
FIGS. 2B, 2C, 2D, and 2E are rear perspective views of illustrative diagrams of computing devices similar to the device illustrated in FIG. 2A, having alternate embodiments of a support member.
Figure 2C:
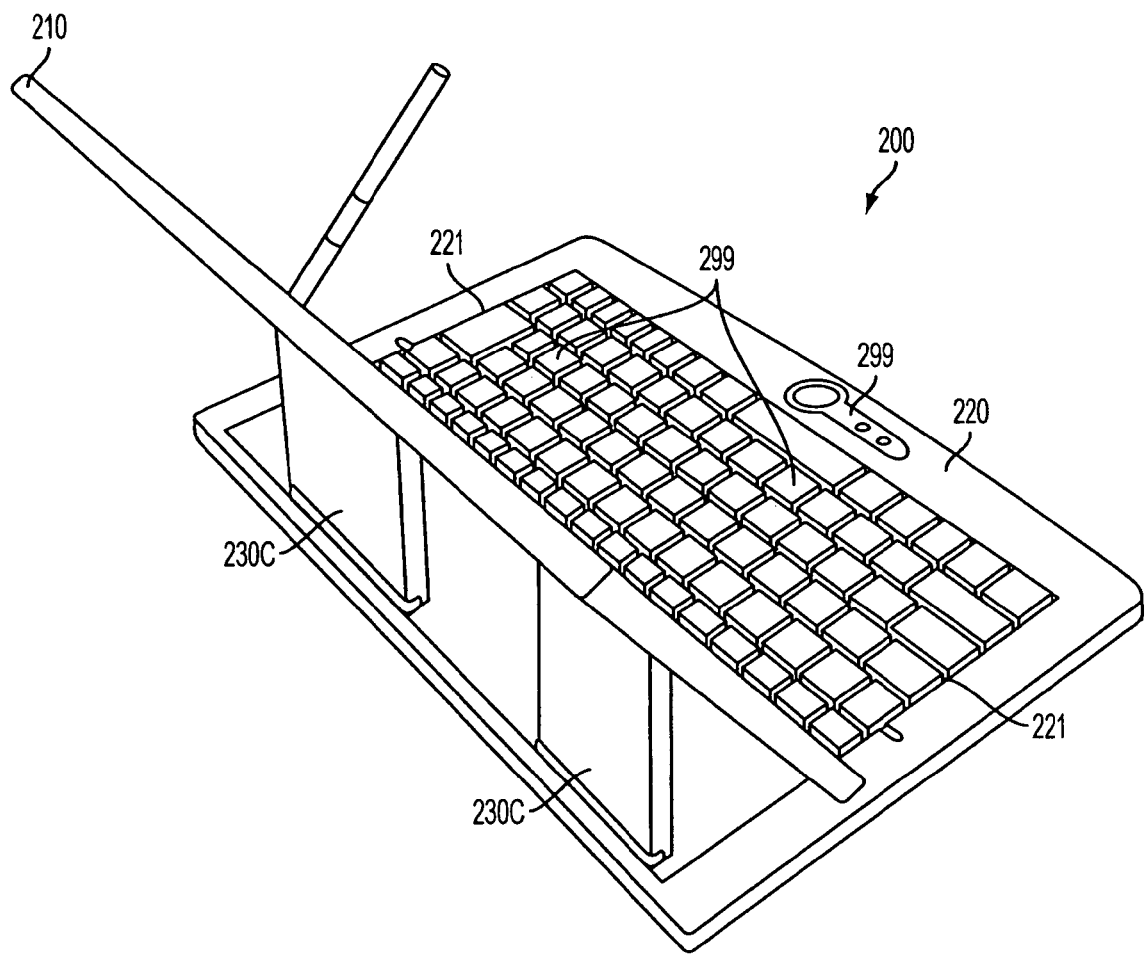
Figure 2D:
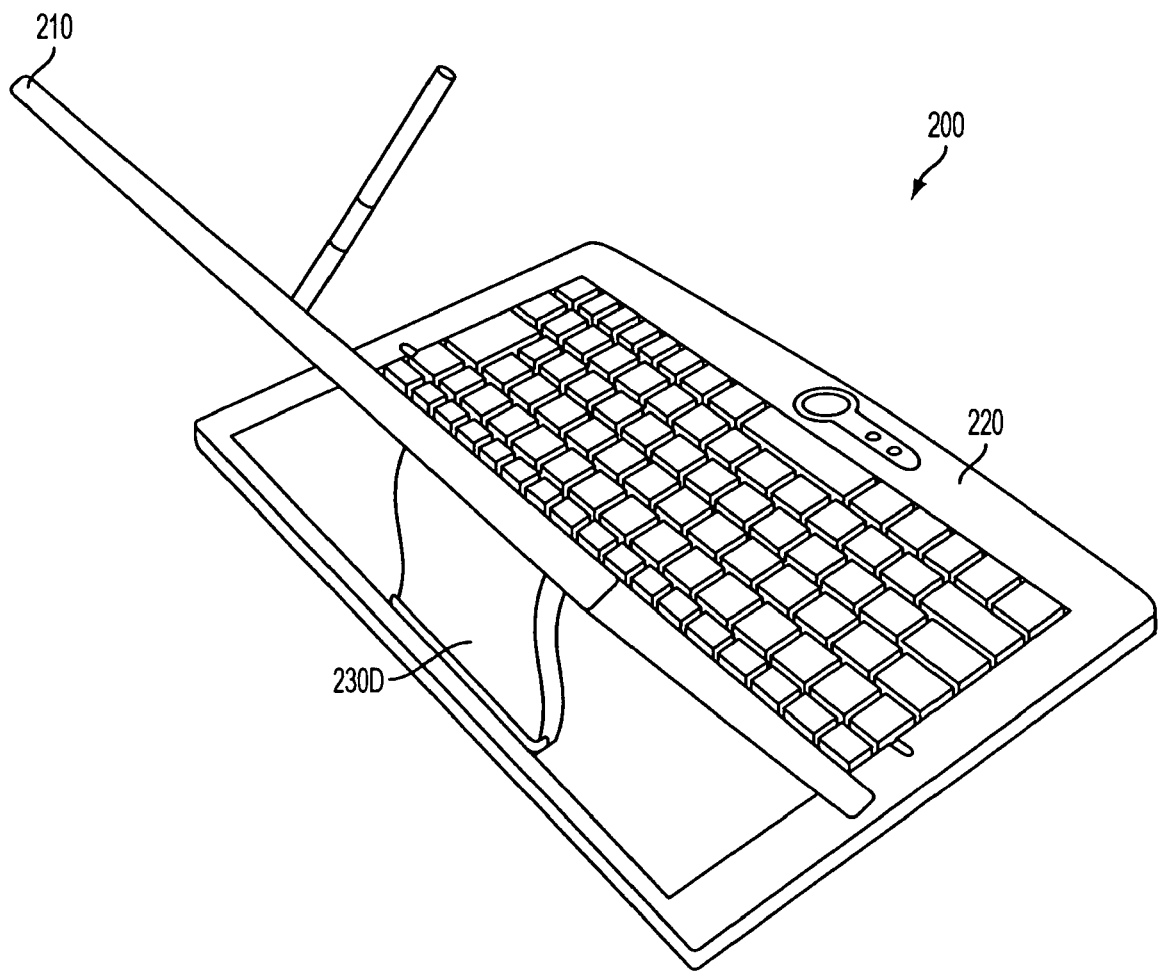
Figure 2E:
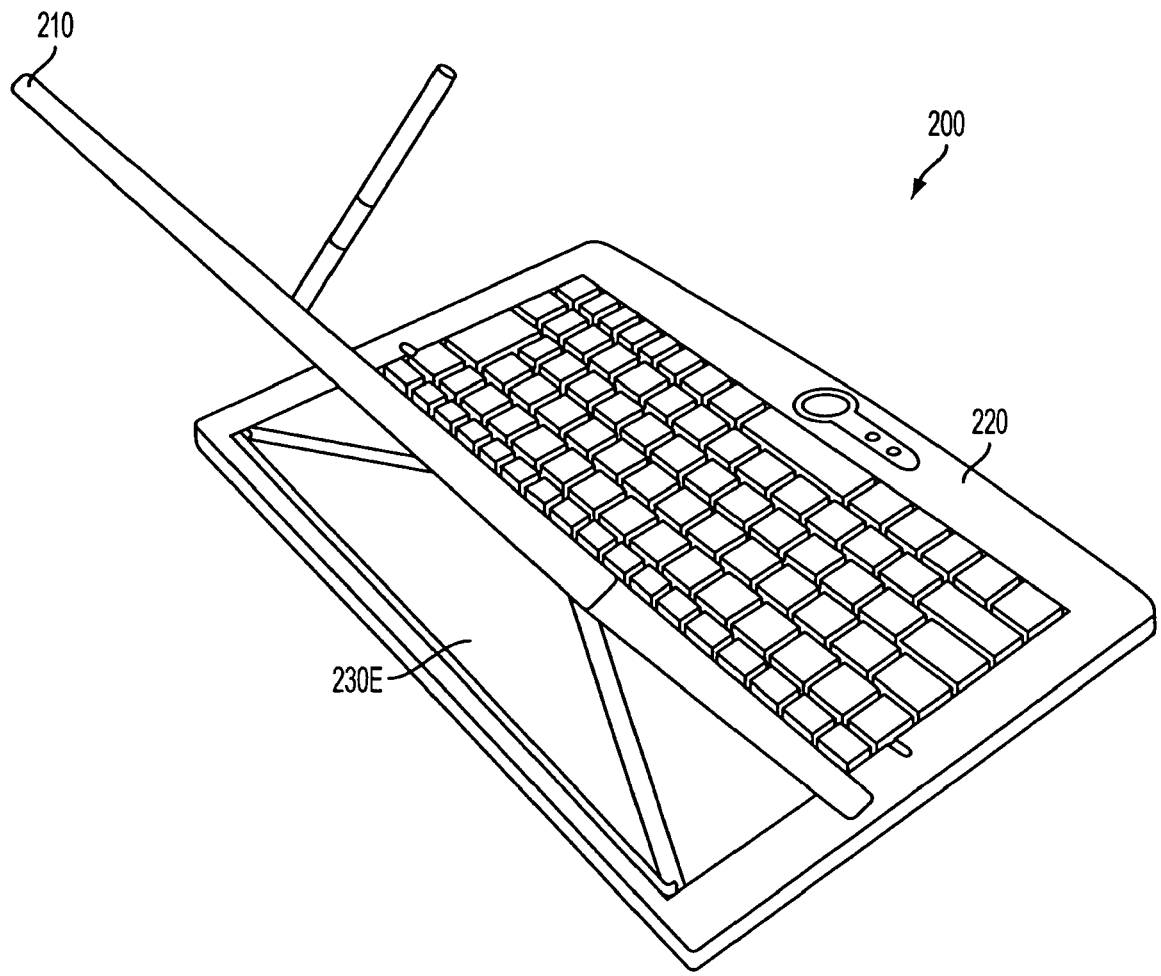

In FIG. 2B, two support members 230B of reduced width and separated by a gap in a computing device 200 are utilized in lieu of a single rectangularly shaped support member 230. FIG. 2C illustrates a computing device having two support members 230C similar to those described in FIG. 2B, however, the two support members depicted in FIG. 2C are located so that the support members lie inward from the outer edge line 221 of the user input region 299. In this illustrative alternate embodiment, the track that is utilized as part of a second coupling between the display unit 210 and base unit 220 may be run within the user input region 299. The track 310 may be positioned so as to run between keys within the keyboard, for example in a ladder shape, without requiring the keyboard shape or layout to be significantly altered from a conventional keyboard configuration. The follower 320 may be accordingly positioned on display unit 210 to permit sliding movement along the track 310 as the display unit 210 is moved relative to the base unit 220. FIG. 2D illustrates yet another alternate embodiment of a support member 230D according to the present invention. Here, computing device 200 has a single support member 230D with contoured sides and is positioned to engage both base unit 220 and display unit 210 near their horizontal center. A contoured side support member 230D enables a decreased thickness to be utilized in computing device 200 as the contours of support member 230D may be routed to avoid thicker components that may protrude in irregular locations on the rear face 211 of display unit 210, thereby enabling the computing device 200 to have a thinner cross-section. Also, the curves may be contoured to a human hand to allow for a grip location when the user moves support member 230D. FIG. 2E illustrates another alternate embodiment of a support member 230E. Here, single support member 230E possesses a trapezoidal shape. The width of the end of support member 230E that engages display unit 210 through a hinge mechanism is smaller than the width of the end of the support member that engages base unit 220. While FIGS. 2A-2E depict several support member embodiments, the specific physical characteristics of support member 230 may be varied based upon desired aesthetic appearance, specific manner of attachment to either display unit 210 or base unit 220, or desired geometric characteristics.

The track 310 and follower 320 connection coupling base unit 220 to display unit 210 is formed by a track 310 placed within the base unit 220 housing and an associated follower 320 that extends from display unit 210 and slidably runs along the length of the track 310. When follower 320 is moved along track 310, display unit 210 is orientated in a variety of positions relative to base unit 220. Follower 320 contacts track 310 holding the display's orientation during use of computing device 200.

Track 310 and follower 320 are mating components with their contact surfaces engaging so as to allow both movement and resistance depending on their location relative to each other. Track 310 may be a channel or groove the runs in a generally horizontal direction. For example, the channel may be U-shaped, V-shaped, curved or cylindrical in cross-section. The channel may alternatively be irregularly shaped, such as the channel and follower depicted in FIG. 3E. The associated follower will possess a contact surface complimentary to the shape of the channel.

Track 310 may be placed within the internal edges of base unit 220, preferably along the outer edges of an input region on the base unit, for example the outer edge groove 221 of a conventional laptop keyboard. Track 310 will reside within the outer surfaces 260 and 280 of base unit 220. Within base unit 220, the track 310 height may be varied to facilitate the path of motion of display unit 210 relative to base unit 220. An example of a track 310 possessing varying height may be seen in the sequential FIGS. 3A-3D. On such a track 310, when the follower 320, with the front edge of display unit 210 physically attached, traces this varying height pattern, the display is forced to orient itself accordingly. In this manner, the follower's 320 movement along track 310 can be used to make the display move so that display unit 210 clears base unit 220 and attached user input region 299 when computing device 200 is being transitioned from a first functional position, e.g. a laptop position, to a second functional position, e.g. a notebook position.

Figure 3A:
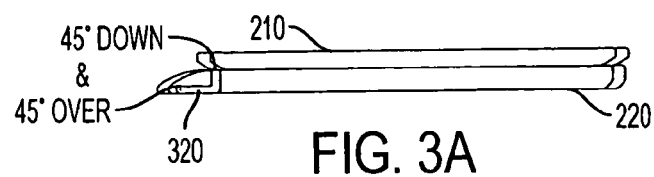
FIGS. 3A, 3B, 3C, and 3D are side views of illustrative diagrams of a convertible computing device in various sequential positions.
Figure 3B:
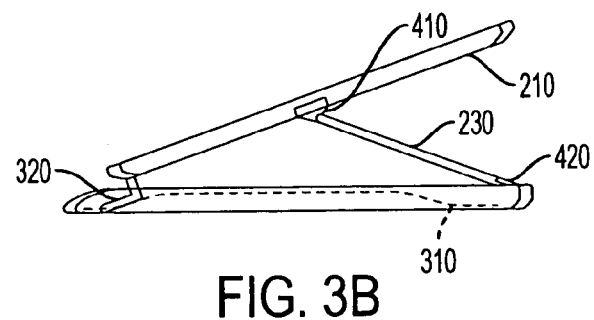
Figure 3C:
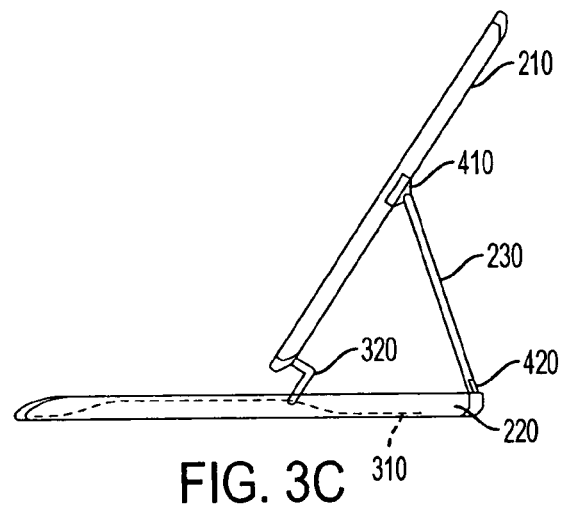
Figure 3D:
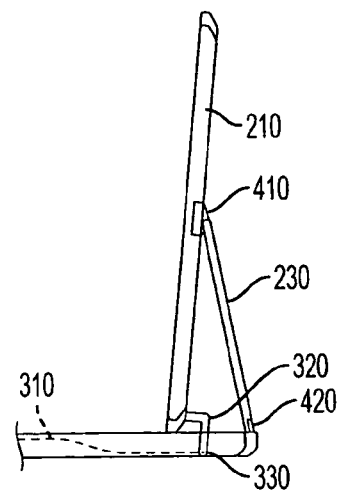
Figure 3E:
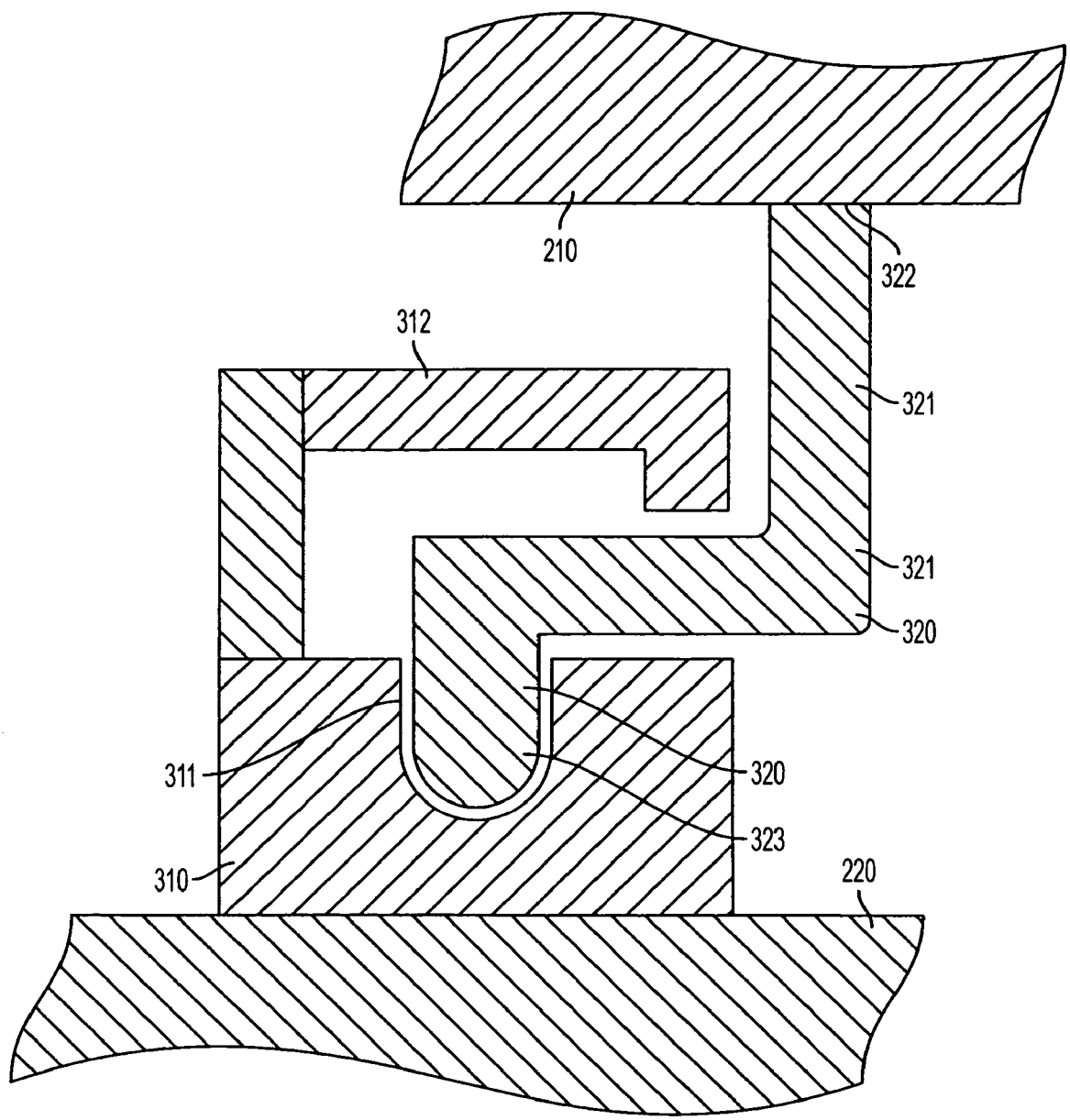
FIG. 3E is a front view cutaway illustrative diagram of an exemplary track and follower mechanism.

An illustrative front view cutaway diagram FIG. 3E depicts one exemplary configuration of track 310 and follower 320. The depicted follower 320 includes an arm 321 that is attached to display unit 210 at a connection point 322. At the end of arm 321 opposite of the connection point 322 is an engaging end component 323 of follower 320. Engaging end component 323 is configured to mate with the engaging surface 311 of track 310. In this particular embodiment, engaging end component 323 and track engaging surface 311 are both semi-circular, however the particular shape may be any of a number of potential mating shapes including v-shaped, rectangular, or semi-hexagonal. Track 310 may also have a lid component 312 that substantially encloses track 310 and guides the follower 320, thereby preventing follower 320 from leaving track 310. Track 310 may alternatively be open on top to allow follower 320 to temporarily leave track 310 allowing for an increased range of motion.

Track 310 may be located in numerous locations on base unit 220 to allow electronic device 200 to quickly and directly be moved by a user between a plurality of functional positions. Track 310 runs from a point near the front edge 250 of base unit 220 to the a point near the rear edge 270 of base unit 220, parallel to the left edge 260 and right edge 280. In a preferred position of a tablet computer possessing a keyboard on base unit, one track may be run along each of the left edge 261 and right edge 281 of the keyboard, as seen in FIG. 2A. Tracks 310 are located between a top surface 291 and a bottom surface 292 of base unit 220, and may be located so they are not readily apparent to a user of the tablet computing device. Followers 320 in this embodiment move along the left edge 261 and right edge 281 respectively when device 200 is being moved from the tablet position to the laptop position.

In other embodiments not specifically depicted, track 310 or multiple tracks 310 may be run further towards the middle of base unit 220. For example, tracks may be run between keys of a keyboard in a tablet computer. These tracks 310 may be shaped to bend around keys in a conventional keyboard arrangement in a step shape. Alternatively, the key configuration of a keyboard located on an electronic device possessing the described conversion hinge mechanism may be altered to contain straight paths between keys in at least a region of the keyboard to allow for straight line tracks 310 to be run from a position near the front edge 250 of base unit 220 to a position near the rear edge 270 of base unit 220 of a computer 200.

FIGS. 3A-3D illustrate a side view of the conversion of a computing device 200 from a tablet mode to laptop utilizing the hinge mechanism according to the present invention. Likewise, FIGS. 4A-4D illustrate a front view of the conversion of a computing device 200 similar to the one in FIGS. 3A-3D from a tablet mode to laptop utilizing the hinge mechanism according to the present invention. For the entire conversion from tablet to laptop modes, the display remains externally visible. In the described embodiment, track 310 rises and then later falls as one moves from the front of base unit 220 to the rear of base unit 220. The depicted rise in track 310 height lifts the display 210 so as to help clear base unit 220 and then the fall at the end of track 310 helps to maximize the tilt range after the base is cleared.

Figure 4A:
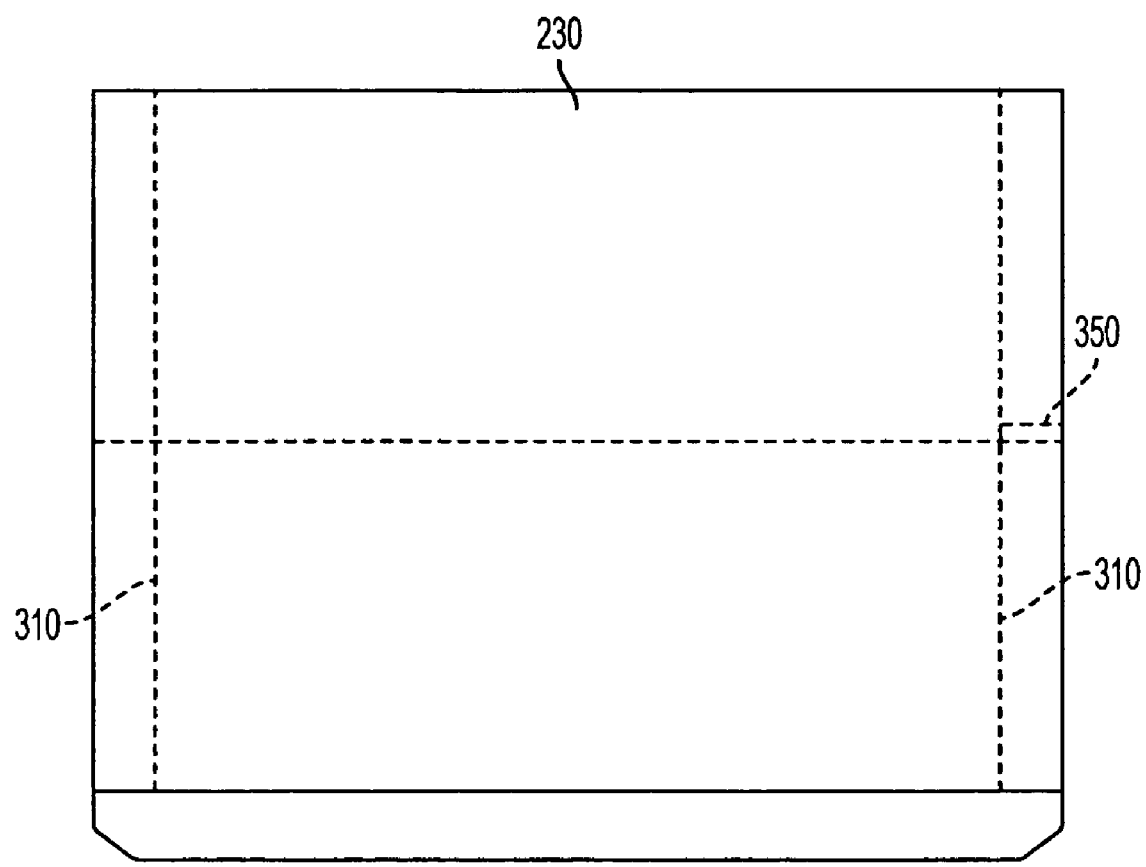
FIG. 4A is a cutaway top view of an illustrative diagram of the base unit of a convertible computing device in a closed position.
Figure 4B:
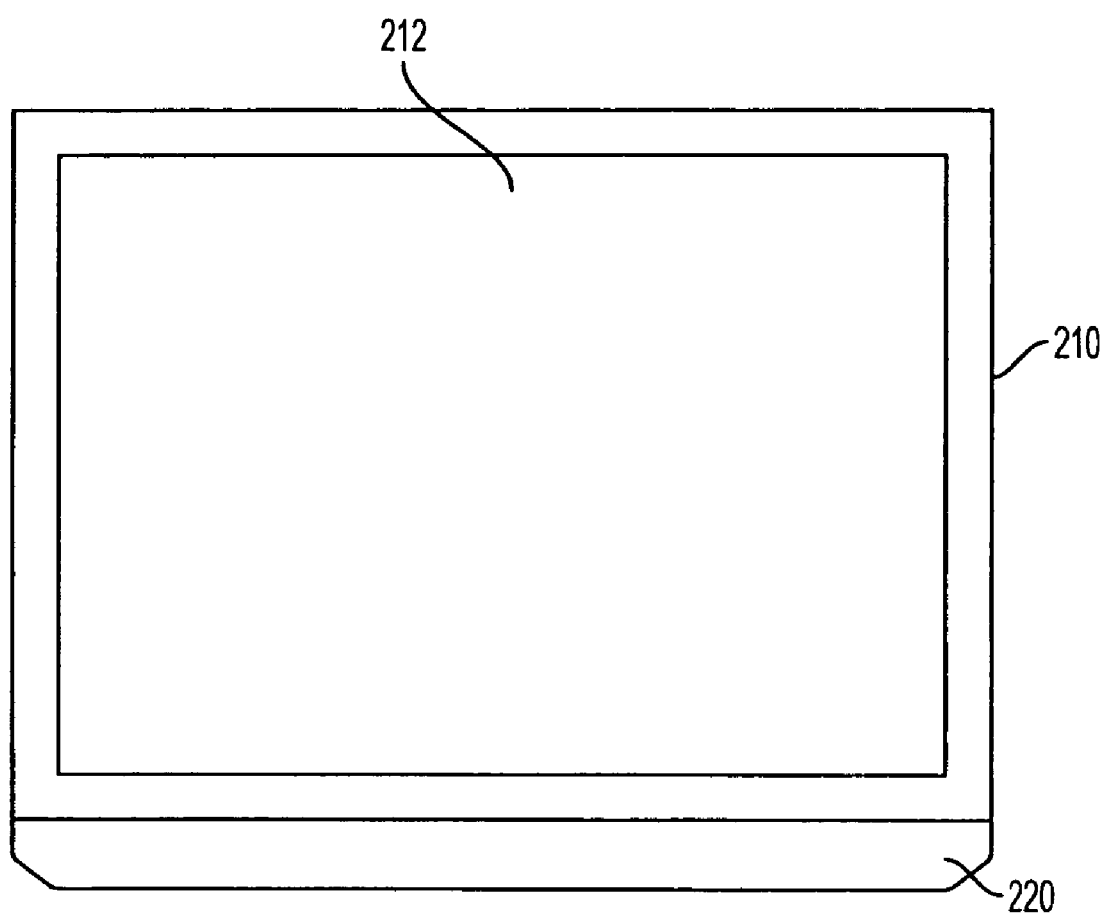
FIG. 4B is a top view of an illustrative diagram of a convertible computing device in a closed position.

FIGS. 3A, 4A, and 4B illustrate the device in tablet mode, or the closed position. A display housed in display unit 210 housing faces outwardly, allowing a user to write, draw and input information via touch screen capabilities known in the art. Display unit, including housed display with screen receptive to touch overlays the base unit as shown in FIG. 4A. Virtually the entire surface area of the computing device when in the closed position may be used for data entry via a touch receptive screen. Since the amount of excess components is minimized, aspects of the present invention facilitate the construction of ever smaller computing devices. For example, computing devices may be built according to the present invention such that the surface area of the device approximates the surface area of either the base or display screen.

Further, in the cutaway FIG. 4A, the location of the internal track 310, support member 230, and latch 350 are apparent. In this embodiment, the track 310 runs along the left side 261 and right side 281 of the keyboard of base unit 220. The hinge that rotationally connects support member 230 and the rear of the display is shown situated within the housing of base unit 220. A slot 222 may be made in the frame of base unit 220 to allow the display engaging hinge 410 to move from its current location within the base unit 220 housing to a location external to the base unit 220 housing as the computing device is moved to the open position.

Figure 3F:
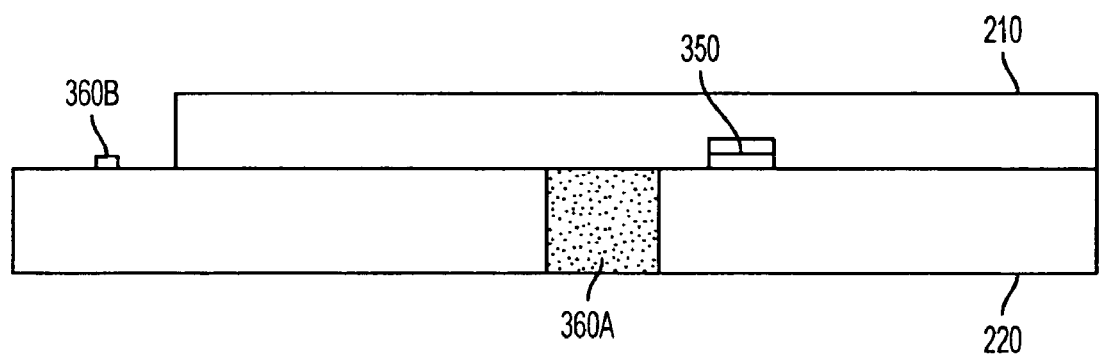
FIG. 3F is a side view of an illustrative diagram of a convertible computing device with a latch and release button feature.

As identified in FIG. 3F, the computer may reposition from a first functional position to a second functional position, for example from a tablet position to a laptop position, automatically after depression of a release 360A. Latch 350 and release 360A may be any type well known in the art. In exemplary FIG. 3F, latch 350 is located on the right side of the display unit 210. When the device is in the tablet position as depicted, latch 350 prevents the device from repositioning into the laptop position. A user may press release 360A which releases latch 350 and allows the device to automatically convert to a second functional position, in this instance a laptop position. Release 360B may also be located in various other locations of the computing device, for example on the top surface 291 of base unit 220 or any portion accessible to a user while the device is in a tablet position. The automatic conversion may be accomplished through use of the gravitational pull on display unit 210 countered by a torsion spring which rotates the support member 230 away from the keyboard as described previously or other similar functioning mechanisms that are commonly known.

Figure 5:
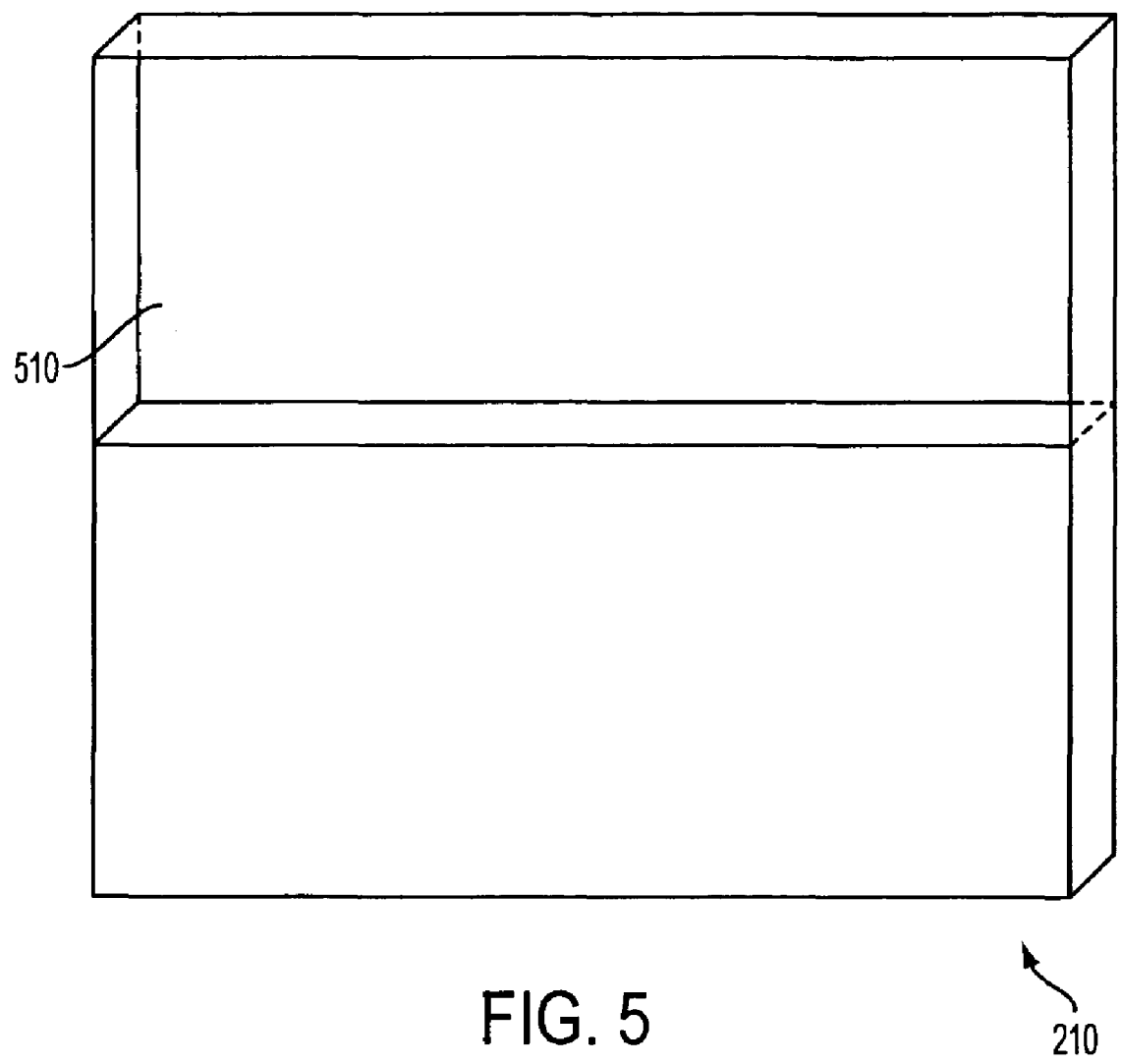
FIG. 5 is a rear view of an illustrative diagram of a display unit.

Support member 230 is oriented while the computing device is in the closed position such that its largest surface area dimension sits generally parallel to the front of the display. To allow for support member 230 to continually remain within an outline defined by the perimeter of display unit 210 while in the closed position, either display unit 210 or the base unit 220 may possess cutout region 510 for support member 230 and associated display engaging hinge 410 mechanism to rest. FIG. 5 illustrates the rear side of a display unit possessing a cutout 510 for a support member 230 similar to that in the computing device illustrated in FIG. 2A. While not depicted, a cutout may be located elsewhere in the computing device, for example the top surface 291 of base unit 220 for support member 230 or other components of the hinge mechanism to rest when the device is placed in certain positions.

To move the device from its orientation in FIGS. 3A and 4A to the orientation illustrated in FIG. 3B, the rear of the display may be raised during which support member 230 begins to tilt up from its position between display unit 210 and base unit 220. In some embodiments, follower 320 may be initially located in an anchor position. The anchor may be located, for example as shown in FIG. 3A, 45 degrees below and 45 degrees forward of the front edge of display unit 210. This geometric alignment may assist display unit 210 in clearing the base during conversion from the closed position to the open position. Further to facilitate positioning, the gravitational pull on display unit 210 may be countered by a torsion spring at a rotating end of support member which rotates the support member 230 away from the base unit 220. Friction at the rotating end of the support, and friction along track 310, may each be used to damp the positioning movement. As the system approaches the closed position, latch 350 may engage to prevent further positioning movement until latch 350 is released. In the closed position, the force of the torsion spring may be great enough that when the latch 350 is released, display unit 210 automatically rotates upward, enough that a users hand can easily grip the side of display unit 210. The display unit housing or perimeter frame may serve as a gripping point for orientating the electronic device. Further, to facilitate positioning, display unit 210 may have a gripping feature attached to the rear of the face of display unit 210. The gripping feature may include a handle, peg, cut-out, or other related structures to facilitate grip by a hand. Display unit's 210 border itself may serve as a gripping feature.

Raising the rear edge of the display causes follower member 320 attached to the front edge of display unit 210 to slide along tracks 310 positioned within the housing of base unit 220 along the left and right sides of the depicted keyboard. Continuing to raise the rear of the display, follower member 320 continues to slide along tracks 310 to the intermediate position illustrated in FIG. 3C.

Figure 4C:
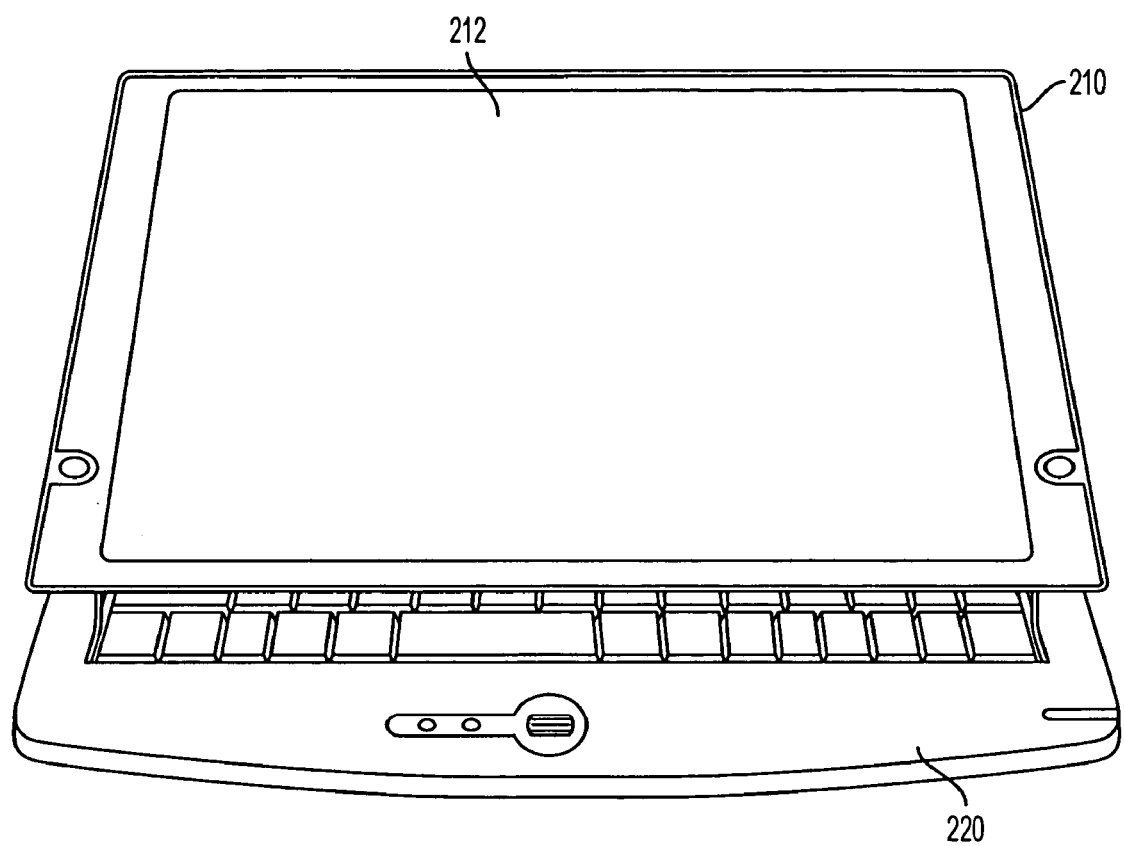
FIGS. 4C and 4D are front perspective views of illustrative diagrams of a convertible computing device in various positions.
Figure 4D:
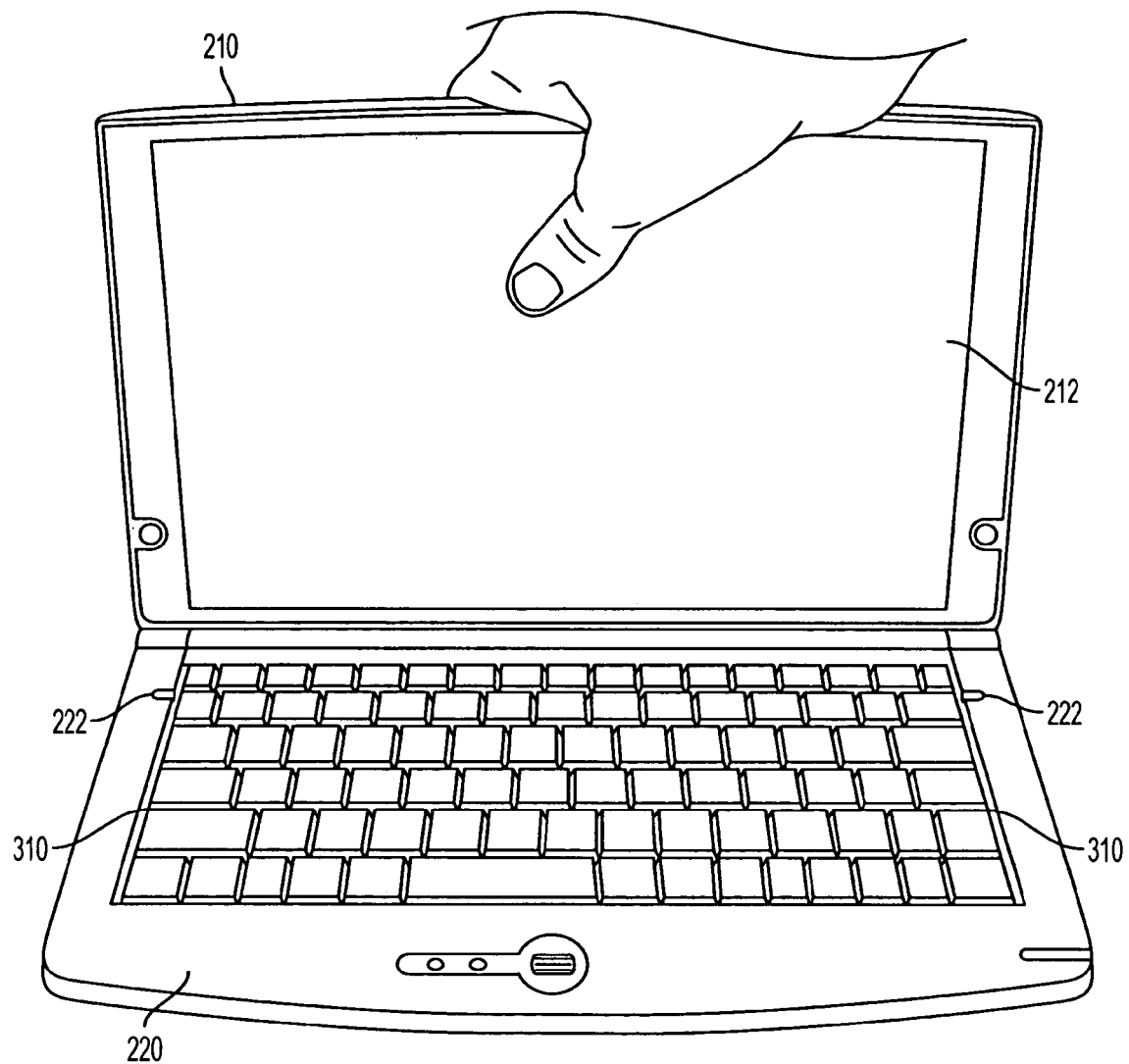

Viewed from the front during transition from the closed to open position, the electronic device may appear as depicted in FIG. 4C. Increasingly, a portion of base unit 220 will become externally visible as follower members 320 slide towards the rear of track 310, thereby, in combination with connected support member 230 not depicted, causing display unit 210 to be rotationally reoriented from a position parallel the base unit 220 towards an orientation generally perpendicular to base unit 220.

Further, lifting the rear portion of display unit 210 from the orientation of FIG. 3C, follower 320 continues along depicted track 310 until the device is oriented as illustrated in FIG. 3D. The device, when positioned as illustrated in FIG. 3D, may be described as being in laptop mode or in an open position. The display is clearly visible and comfortably positioned to allow a user to input information to the device using the keyboard and to view the screen housed in the display unit 210. Display unit 210 is positioned to fully expose the keyboard, thereby allowing the entire functionality of the keyboard to be utilized. Additionally, locking mechanisms 330, may be located at multiple locations along the track 310 to secure the computing device 200 in any number of incremental orientations. A locking mechanism 330 may be located near or at the rear of track 310 internal to base unit 220 to provide further support. Alternatively, the engaging forces between follower member 320 and track 310 may be used alone to secure the display in the open position. Any touch pads and other typical computing keyboard accessories may also be fully exposed when the device is orientated in the laptop mode to allow the convertible computing device, in this example a tablet PC, to be utilized similar to a conventional laptop computer that fails to possess tablet functionality.

Computing devices that may converted so as to utilize alternate modes of operation utilizing the hinge mechanism or coupling system of the present invention may also utilize a simplified electronics or cabling system. The cabling or circuitry in such a device will not be exposed to significant torque or twisting in which the circuitry may become crimped or otherwise damaged and thus high strength and high resiliency circuitry is not necessary.

Figure 6A:
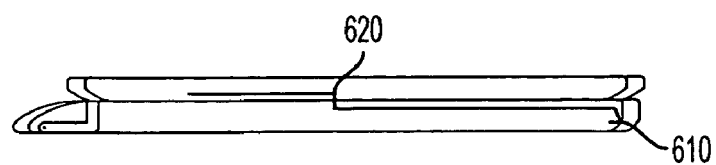
FIGS. 6A, 6B, and 6C are side view diagrams of illustrative diagrams of convertible computing device in sequential positions substantially illustrating an electrical coupling.
Figure 6B:
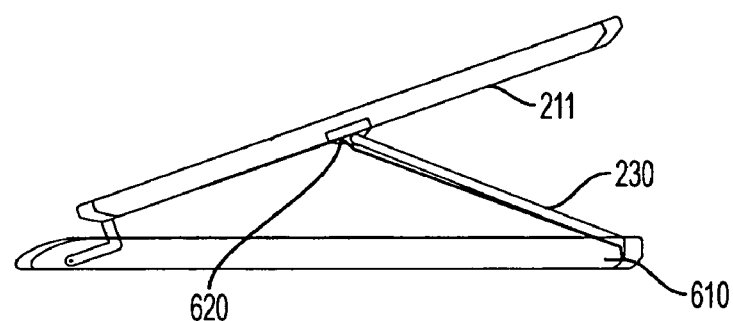
Figure 6C:
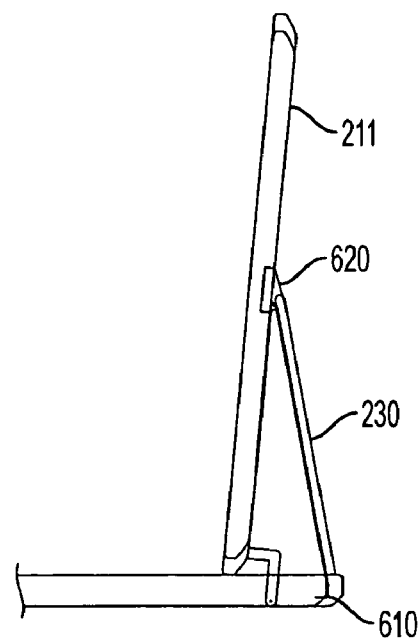

FIGS. 6A-6C are side view illustrative diagrams of the positioning of circuitry housed in a convertible computing device according to the present invention. FIG. 6A illustrates the physical orientation of the circuitry in the closed position, FIG. 6C illustrates the physical orientation of the circuitry in the open position, and FIG. 6B illustrates the physical orientation of the circuitry in an intermediate position during conversion from the closed position to the open position or vice-versa.

In the closed position, only the portion of support member 230 containing hinge 410 that engages the back face of display unit 210 is apparent through a slit cut in base unit 220 as shown in the side view of FIG. 6A. One end of the electronic circuitry is linked to hardware components housed within base unit 220 at a base unit connection point 610. The circuitry is run from the base unit connection point 610 to a display unit connection point 620 where support member 230 engages the rear side of display unit 210. The circuitry connecting these two connection points runs along the front of support member 230, from a position on base unit 220 adjacent to the rotational hinge that connects the support member 230 to base unit 220 to a position on display unit 210 adjacent to the rotational hinge 410 that connects support member 230 to display unit. As the computing device is moved from the closed position to the open position or vice versa, the circuitry that runs along the front surface of the support members 230 is also moved as well. However, minimal force is applied to the circuitry at either of the connection points 610, 620 due to the limited movement at these points. The portions of the circuitry running along the surface of support member 230 may also be moved through the device's range of motion without being subject to significant movement or forces. The circuitry is protected from foreign objects by the support member and may be held in place by adhesive or hook details on the surface of the support member. The circuitry is never subjected to potentially damaging torsion and compression forces such as those present in conventional convertible personal computers.

Further, this electronic system connecting base unit and display unit 210 may be described as a flex circuit and allows for the optimizing of electrical properties. The hinge configuration, geometry and mechanisms allows the circuitry to avoid twists and extreme folds, improving reliability. The flex circuit may be several inches wide if desired, thereby allowing it to carry far more signal than a traditional hinge cabling and allowing designers new partitioning options, such as moving electrical components normally in the display unit into the base unit, or vice versa. The circuitry may also be flat and run along the surface of support member 230.

The described hinge and electronics systems allows convertible electronic devices to be quickly and easily converted from a first functional position, such as a laptop mode shown in FIG. 2A, to a second functional position, such as tablet mode in FIG. 4B. In addition to hybrid or convertible computers that function in a traditional laptop mode and a tablet mode, the previously described hinge mechanisms may be utilized in numerous other electronic devices such as PDAs, cell phones, pagers, smart phones camera, phones, etc, to allow for increased functionality. Generally, the present invention may be utilized in any electronic device with an input portion and a display portion coupled together.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A tablet personal computer comprising:
   a display housing including a cutout recess and a follower member;
   a body housing having a front end, a back end, a top, a bottom, an input device, and an internal track, the follower member running along the internal track;
   a flex circuit electronic system; and
   a hinge mechanism housing a portion of the flex circuit electronic system and connecting the display housing to the body housing, the hinge mechanism being configured such that when the computer is moved from a tablet position to a laptop position, the follower member runs along the internal track from the front end to the back end of the body housing, the follower member being closer to the top when adjacent to the input device than when at the front end and the back end of the body housing.

2. The tablet personal computer of claim 1, wherein the input device is a keyboard.

3. The tablet personal computer of claim 1, wherein the display housing includes a gripping feature.

4. The tablet personal computer of claim 1, further including a locking mechanism on the internal track that engages upon device orientation.

5. The tablet personal computer of claim 1, further including a latch for releasably holding the display housing in a first position.

6. The tablet personal computer of claim 5, wherein the display housing is automatically moved to a second position upon release of the latch.

7. The computer of claim 1, wherein a first end of the hinge mechanism is rotationally attached to a rear face of the display housing.

8. The computer of claim 7, wherein a second end of the hinge mechanism opposite of the first end is rotationally attached to a top face of the body housing.

9. The computer of claim 7, wherein a portion of the hinge mechanism sits in a cutout of a top surface of the body housing.

10. The computer of claim 1, wherein the hinge mechanism includes a plurality of rigid members each connecting the display housing to the body housing.

11. The tablet personal computer of claim 1, wherein the display housing further includes a screen.

12. The tablet personal computer of claim 11, wherein the screen further comprises a touch receptive screen.

13. A coupling system comprising:
   a first housing element having a follower member and including a display including a screen with an upper end and a lower end;
   a second housing element including a front end, a back end, a top, a bottom, a user input region, and an internal track along which the follower member runs, the internal track running from the front end to the back end, wherein the internal track is configured to be closer to the top at a portion adjacent to the user input region than at the front end and the back end;

a third housing element having a rotational hinge at two opposite ends, one of the rotational hinges being attached to the first housing element on a face opposite the display between the upper and lower ends; and a coupling system movably linking the first housing element, the second housing element and the third housing element so as to permit only translation and rotation of the first housing element relative to the second housing element in the x-z plane.

14. The coupling system of claim 13, wherein the display is a touch receptive screen and the user input region includes a keyboard.

15. The coupling system of claim 14, wherein the third housing element includes electronic circuitry.

16. The coupling system of claim 13 wherein the input device has a left edge and a right edge and wherein the track runs medial to the left edge and the right edge between the front end and the back end of the second housing element.

* * * * *